US010672387B2

(12) United States Patent
Lyon et al.

(10) Patent No.: US 10,672,387 B2
(45) Date of Patent: Jun. 2, 2020

(54) SYSTEMS AND METHODS FOR RECOGNIZING USER SPEECH

(71) Applicant: GOOGLE LLC, Mountain View, CA (US)

(72) Inventors: Richard Lyon, Los Altos, CA (US); Christopher Hughes, Redwood City, CA (US); Yuxuan Wang, Mountain View, CA (US); Ryan Rifkin, Oakland, CA (US); Pascal Getreuer, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 42 days.

(21) Appl. No.: 15/839,499

(22) Filed: Dec. 12, 2017

(65) Prior Publication Data

US 2018/0197533 A1 Jul. 12, 2018

Related U.S. Application Data

(60) Provisional application No. 62/445,190, filed on Jan. 11, 2017.

(51) Int. Cl.
*G10L 15/16* (2006.01)
*G10L 15/02* (2006.01)
(Continued)

(52) U.S. Cl.
CPC ............ *G10L 15/16* (2013.01); *G10L 15/02* (2013.01); *G10L 19/26* (2013.01); *G10L 15/20* (2013.01);
(Continued)

(58) Field of Classification Search
CPC ......... G10L 15/16; G10L 15/02; G10L 19/26; G10L 15/20; G10L 25/18; G10L 2015/223
See application file for complete search history.

(56) References Cited

U.S. PATENT DOCUMENTS 4,630,305 A * 12/1986 Borth ................. G10L 21/0208
381/317
5,765,124 A * 6/1998 Rose ...................... G10L 15/20
704/226
(Continued)

FOREIGN PATENT DOCUMENTS

EP 0508547 A1 10/1992

OTHER PUBLICATIONS

Bature et al., Design of Digital Recursive Filter Using Artificial Neural Network, 2012, IMECS, whole document (Year: 2012).*
(Continued)

*Primary Examiner* — Sonia L Gay
(74) *Attorney, Agent, or Firm* — Morgan, Lewis & Bockius LLP

(57) ABSTRACT

The various implementations described herein include methods, devices, and systems for recognizing speech, such as user commands. In one aspect, a method includes: (1) receiving audio input data via the one or more microphones; (2) generating a plurality of energy channels for the audio input data; (3) generating a feature vector by performing a per-channel normalization to each channel of the plurality of energy channels; and (4) obtaining recognized speech from the audio input utilizing the feature vector.

20 Claims, 8 Drawing Sheets
(2 of 8 Drawing Sheet(s) Filed in Color)

(51) Int. Cl.
*G10L 19/26* (2013.01)
*G10L 15/20* (2006.01)
*G10L 25/18* (2013.01)
*G10L 15/22* (2006.01)

(52) U.S. Cl.
CPC ........ *G10L 25/18* (2013.01); *G10L 2015/223* (2013.01)

(56) References Cited

U.S. PATENT DOCUMENTS

| | | | | |
|---|---|---|---|---|
| 6,308,155 | B1* | 10/2001 | Kingsbury | G10L 15/02 704/231 |
| 8,521,530 | B1* | 8/2013 | Every | H04M 9/08 381/66 |
| 9,972,318 | B1* | 5/2018 | Kelly | G10L 15/22 |
| 2008/0147391 | A1 | 6/2008 | Jeong et al. | |
| 2010/0027820 | A1* | 2/2010 | Kates | G10L 25/00 381/312 |
| 2010/0239104 | A1* | 9/2010 | Iser | G10L 21/0208 381/94.2 |
| 2016/0171975 | A1* | 6/2016 | Sun | G06F 1/3206 704/234 |

OTHER PUBLICATIONS

Google, International Search Report / Written Opinion, app No. PCT/US2017/066948, dated Mar. 22, 2018, 16 pgs.

\* cited by examiner

SYSTEMS AND METHODS FOR RECOGNIZING USER SPEECH

RELATED APPLICATIONS

This application claims priority to U.S. Provisional Patent Application No. 62/445,190, entitled "Systems and Methods for Audio Processing," filed Jan. 11, 2017, which is hereby incorporated by reference in its entirety.

This application is related to U.S. Provisional Patent Application No. 62/336,566, entitled "LED Design Language for Visual Affordance of Voice User Interfaces," filed May 13, 2016, U.S. Provisional Patent Application No. 62/334,434, entitled "Implementations for Voice Assistant on Devices," filed May 10, 2016, and U.S. patent application Ser. No. 15/284,493, entitled "Noise Mitigation for a Voice Interface Device," filed Oct. 3, 2016, each of which is hereby incorporated by reference in its entirety.

TECHNICAL FIELD

The disclosed implementations relate generally to audio processing, including but not limited to methods and systems utilizing energy normalization for speech recognition.

BACKGROUND

Electronic devices integrated with microphones have been widely used to collect voice inputs from users and implement voice-activated functions according to the voice inputs. For example, many state-of-the-art mobile devices include a voice assistant feature (e.g., Siri, Google Assistant) that is configured to use voice inputs to initiate a phone call, conduct a restaurant search, start routing on a map, create calendar events, add a post to a social network, recognize a song, and complete many other tasks.

A location (e.g., a room or space within a home) may include significant background noise, multiple speakers, and/or a speaker who is at a significant distance from the electronic device. It is desirable for the device to include noise and/or background mitigation measures.

SUMMARY

Accordingly, there is a need for methods, apparatuses, and systems for managing audio processing and audio recognition. Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to manage radar with smart devices. In one aspect, an electronic device is configured to utilize a per-frequency-channel amplitude normalization or per-frequency-channel energy normalization to distinguish audio directed toward to the electronic device from background audio and/or noise.

Robust and far-field speech recognition is needed to enable true hands-free communication. Additionally, in far-field conditions signals are attenuated due to distance. In some implementations of the present disclosure robustness to loudness variation is improved by utilizing a novel frontend called per-channel energy normalization (PCEN). Frequency channels are also sometimes called frequency bins. In some implementations, the PCEN includes the use of an automatic gain control based dynamic compression to replace the widely used static (such as log or root) compression. In some implementations, PCEN is utilized for keyword spotting tasks. PCEN significantly improves recognition performance in far-field and noisy situations. In some implementations, PCEN frontend is trained by modeling it as neural network layers and optimizing high-dimensional PCEN parameters jointly with a keyword spotting acoustic model. The trained PCEN frontend demonstrates significant further improvements without increasing model complexity or inference-time cost.

Speech has become a prevailing interface to enable human-computer interaction, especially on mobile devices. A significant component of such an interface is a keyword spotting (KWS) system. For example, KWS is often used to wake up mobile devices or to initiate conversational assistants. Therefore, reliably recognizing keywords, regardless of the acoustic environment, is important for effective interaction with speech-enabled products.

Thanks to the development of deep neural networks (DNN), automatic speech recognition (ASR) has improved in the past few years. However, robustness remains a major challenge for current ASR systems. This also applies to KWS systems. KWS systems need to be robust to not only various kinds of noise interference but also varying loudness (or sound level). The capability to handle loudness variation is important because it allows users to talk to devices from a wide range of distances, enabling true hands-free interaction.

KWS systems may also be neural network based. However, KWS systems are generally resource-limited embedded systems, and thus have energy and size constraints. Specifically, the KWS systems are generally run on devices and always listening, which generally requires small memory footprints and low power consumption. Therefore, the size of the neural network needs to be much smaller than those used in other ASR systems, implying a smaller network with a limited representation power. In addition, on-device keyword spotting typically does not use sophisticated decoding schemes or language models.

In DNN-based acoustic modeling a log-mel frontend consisting of mel-filterbank energy extraction followed by log compression is used, where the log compression is used to reduce the dynamic range of filterbank energy. However, there are several issues with the log function. First, a log function has a singularity at zero. Common methods to deal with the singularity are to use either a clipped log, such as log(max(offset; x)), or a stabilized log, such as log(x+offset). However, the choice of the offset in both methods is ad hoc and may have different performance impacts on different signals. Second, the log function uses a lot of its dynamic range on low level, such as silence, which is likely the least informative part of the signal. Third, the log function is loudness dependent. With different loudness, the log function can produce different feature values even when the underlying signal content (e.g. keywords) is the same, which introduces another factor of variation into training and inference.

To remedy the above issues of log compression, some implementations of the present disclosure include a frontend utilizing per-channel energy normalization (PCEN). In some implementations, the PCEN frontend implements a feed-forward automatic gain control (AGC), which dynamically stabilizes signal levels. In some implementations, the PCEN is implemented as neural network operations and/or layers, and various PCEN parameters are optimized with a KWS acoustic model.

The present disclosure teaches a new robust frontend called PCEN (e.g., to supplement or replace the static log (or root) compression) utilizing an AGC-based dynamic compression.

In accordance with some implementations, a method is performed at an electronic device with one or more microphones, one or more processors, and memory storing one or more programs for execution by the one or more processors. The method includes: (1) receiving audio input data via the one or more microphones; (2) generating a plurality of energy channels for the audio input data; and (3) generating a feature vector by performing a per-channel normalization to each channel of the plurality of energy channels.

In some implementations, the method further includes transmitting the feature vector to a neural network for speech recognition.

In some implementations, generating the plurality of energy channels comprises applying a short-time Fourier transform to the audio input data.

In some implementations, performing per-channel normalization comprises applying a smoothing filter and non-linearity function to each energy channel.

In some implementations, applying a smoothing filter to each energy channel comprises utilizing a first smoothing coefficient for a first energy channel and applying a second smoothing coefficient for a second energy channel, wherein the first smoothing coefficient is distinct from the second smoothing coefficient.

In some implementations, the non-linearity function comprises a squareroot function.

In some implementations, the per-channel normalization comprises one of a per-channel energy normalization or a per-channel amplitude normalization.

In accordance with some implementations, an electronic device having one or more microphones, one or more processors, and memory is configured to perform any of the methods described herein.

In accordance with some implementations, a non-transitory computer-readable storage medium stores one or more programs, the one or more programs including instructions, which, when executed by an electronic device with one or more microphones, and one or more processors, cause the electronic device to perform any of the methods described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
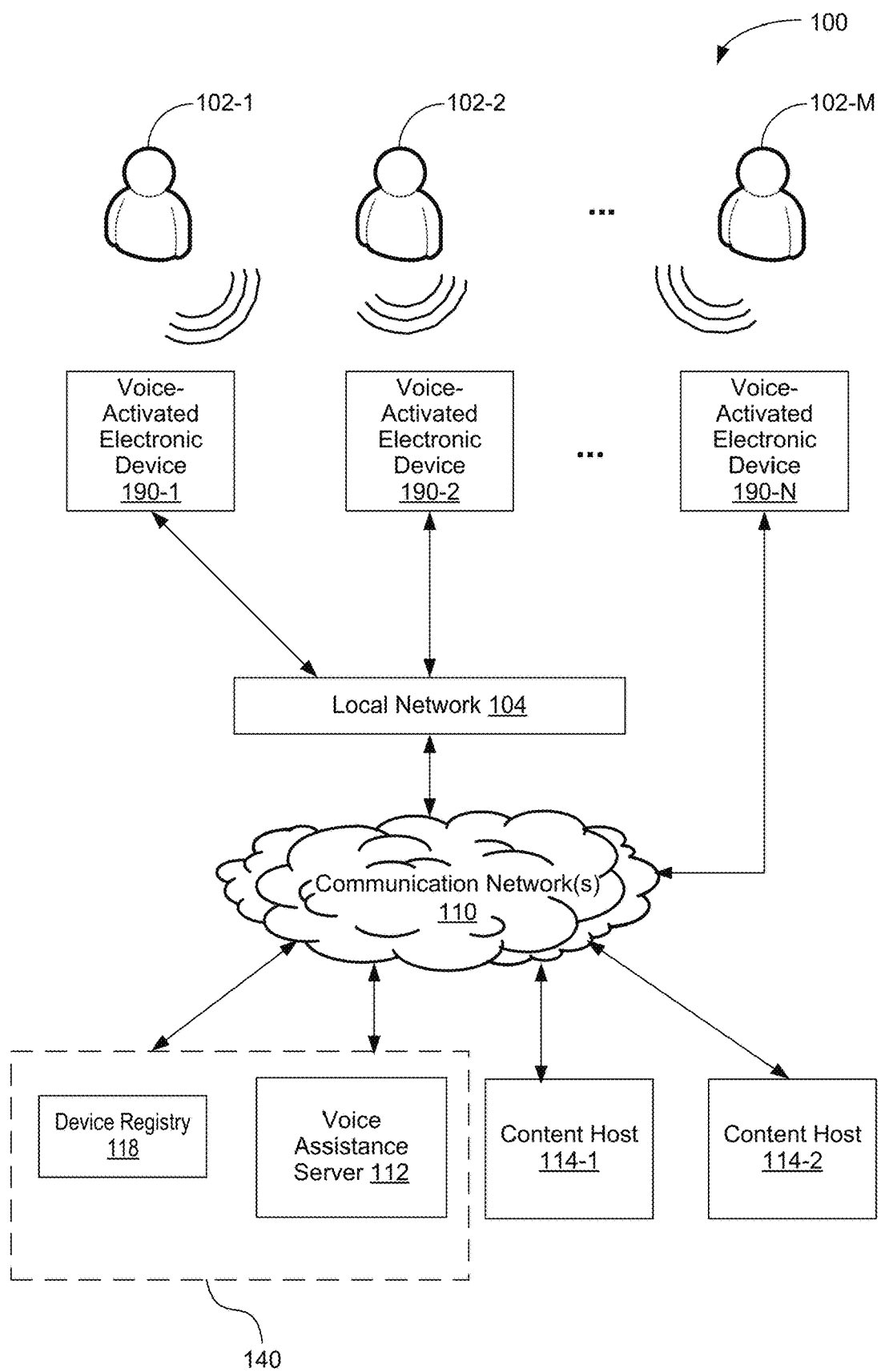
FIG. 1 is an example operating environment in accordance with some implementations.

While the digital revolution has provided many benefits ranging from openly sharing information to a sense of global community, emerging new technology often induces confusion, skepticism and fear among consumers, preventing consumers from benefitting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at the electronic device can carry instructions and information even if a user's line of sight is obscured and his hands are full. To enable a hands-free and eyes-free experience, the voice-activated electronic device listens to the ambient (i.e., constantly processes audio signals collected from the ambient) constantly or only when triggered. On the other hand, user identities are linked with a user's voice and a language used by the user. To protect the users' identity and/or privacy, these voice-activated electronic devices are normally used in non-public places that are protected, controlled and intimate spaces (e.g., home and car).

In accordance with some implementations, a voice-activated electronic device identifies a speaker of a voice input as one of one or more associated or registered users. Responses to the speaker output by the electronic device are personalized to the identified speaker. The speaker is identified by comparing the speaker's voice input to a set of trained voice models or voice fingerprints. In some implementations, words and phrases used by a speaker to train the voice models are not necessarily predefined and do not need to match words later spoken by the speaker in order for the electronic device to identify the speaker.

Further, in accordance with some implementations, multiple voice-activated electronic devices negotiate a leader amongst themselves to respond to voice inputs from a user. The negotiation may be based on which device detected the voice input the best, or which device is the closest to the user. Additionally, if the voice input is particularly relevant to one of the devices, that device may be selected to respond even if it would otherwise not be selected for response; the relevance of the command included in the voice input to a particular device (e.g., "stop music" should refer to a device playing music) and the state of the device receiving the voice input (e.g., "screen on" vs. "screen off") are considered in determining which device will be the leader.

Further, in accordance with some implementations, a voice-activated device determines whether the surrounding noise is sufficiently interfering with detection of spoken hotwords for waking up the device or other spoken voice inputs. In accordance with some implementations, a "hot-word" is a user defined or predefined word or phrase used to "wake-up" or trigger a voice-activated device to attend/ respond to a spoken command that is issued subsequent to the hotword. If the noise is sufficiently interfering, the device indicates such and gives the user a hint to use an alternative way of waking up the device or other noise mitigation measures.

FIG. 1 is an example operating environment in accordance with some implementations. The operating environment 100 includes one or more voice-activated electronic devices 190 (e.g., electronic devices 190-1 thru 190-N). The one or more voice-activated electronic devices 190 are optionally located in one or more locations (e.g., all in a room or space of a structure, spread out throughout multiple spaces within a structure or throughout multiple structures (e.g., one in a house and one in the user's car)). The environment 100 optionally includes one or more other devices (e.g., media devices, smart home devices) (not shown) with which the voice-activated electronic devices 190 can communicate.

The electronic devices 190 are communicatively coupled, through communication networks 110, to a voice assistance server 112 of a voice assistant service. In some implementations, one or more of the electronic devices 190 are communicatively coupled to a local network 104, which is communicatively coupled to the communication networks 110 (e.g., electronic devices 190-1 and 190-2). In some implementations, the local network 104 is a local area network implemented at a network interface (e.g., a router). The electronic devices 190 that are communicatively coupled to the local network 104 optionally also communicate with each other through the local network 104.

Optionally, one or more of the electronic devices 190 are communicatively coupled to the communication networks 110 and are not on the local network 104 (e.g., electronic device 190-N). For example, these electronic devices 190 are not on the Wi-Fi network corresponding to the local network 104 but are connected to the communication networks 110 through a cellular connection. In some implementations, communication between electronic devices 190 that are on the local network 104 and electronic devices 190 that are not on the local network 104 are performed via the voice assistance server 112. The electronic devices 190 are registered in a device registry 118 of the voice assistant service and thus known to the voice assistance server 112.

The environment 100 also includes one or more content hosts 114. In some implementations, a content host 114 is a remote content source from which content is streamed or otherwise obtained in accordance with a user voice request. In some implementations, a content host 114 is an information source from which the voice assistance server 112 retrieves information in accordance with a user voice request.

In some implementations, an electronic device 190 is associated with multiple users having respective user accounts in the user domain. Any of these users, as well as users not associated with the device, may make voice inputs to the electronic device 190. The electronic device 190 receives these voice inputs from these users 102-1 thru 102-M (e.g., including associated and unassociated users), and the electronic device 190 and/or the voice assistance server 112 proceeds to identify, for a voice input, the user making the voice input. With the user identification, a response to that voice input is optionally personalized to the identified user.

In some implementations, the environment 100 includes multiple electronic devices 190 (e.g., devices 190-1 thru 190-N). The devices 190 are located throughout the environment 100 (e.g., all within a room or space in a structure, spread throughout the structure, some within the structure and some without). When a user 102 makes a voice input, each of the devices 190 either receives the input or does not receive the input (e.g., if the device was too far away from the user). The devices that receive the input receive it at varying degrees of quality; the quality of the sample of the voice input at a device is based on multiple factors, including but not limited to distance of the user from the device and the noise around the device. In some implementations, the multiple devices 190 negotiate a leader amongst themselves to respond to the user and to receive further voice input from the user 102 (e.g., based on the quality of the samples of the voice inputs).

In some implementations, an electronic device 190 determines a level of noise around the device and determines whether the determined noise level is sufficiently high to interfere with recognition of the hotword in voice inputs, and thus interfere with awakening of the device by voice, or with recognition of voice requests. If the noise level is determined to be sufficiently high to be interfering, the electronic device 190 indicates to the user that the noise level is interfering and gives the user a hint that the user should use another way to wake up the electronic device 190 (e.g., activate a button). The indication of the interfering noise level and the hint to use another way to wake up the device are optionally done in the same presentation (e.g., illuminating the wake-up button).

In some implementations, one or more media devices are disposed in the operating environment 100 to provide to one or more occupants media content, news and/or other information. In some implementations, the content provided by the media devices is stored at a local content source, streamed from a remote content source (e.g., content host(s) 114), or generated locally (e.g., through a local text to voice processor that reads a customized news briefing, emails, texts, a local weather report, etc. to one or more occupants of the operating environment 100). In some implementations, the media devices include media output devices that directly output the media content to an audience (e.g., one or more users), and cast devices that are networked to stream media content to the media output devices. Examples of the media output devices include, but are not limited to television (TV) display devices and music players. Examples of the cast devices include, but are not limited to, set-top boxes (STBs), DVD players, TV boxes, and media streaming devices, such as Google's Chromecast™ media streaming device.

In some implementations, the media devices include one or more voice-activated electronic devices 190 that receive, process and respond to voice commands of occupants. In some implementations, the voice-activated electronic devices 190 respond to voice commands by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices within the operating environment 100 (e.g., turning lights, appliances or media devices on/off, locking/unlocking a lock, opening windows, etc.); or issuing a corresponding request to a server via a network 110.

In some implementations, the one or more electronic devices 190 are disposed in the operating environment 100 to collect audio inputs for initiating various functions, including media play functions of the media devices. In some implementations, these voice-activated electronic devices 190 (e.g., devices 190-1 thru 190-N) are disposed in proximity to a media device, for example, in the same room with the cast devices and the media output devices. Alternatively, in some implementations, a voice-activated electronic device 190 is disposed in a room having one or more smart home devices but not any media device. Alternatively, in some implementations, a voice-activated electronic device 190 is disposed in a location having no networked electronic device. Further, in some implementations, a room or space in the structure may have multiple electronic devices 190.

In some implementations, the electronic device 190 includes at least one or more microphones, a speaker, a processor and memory storing at least one program for execution by the processor. The speaker is configured to allow the electronic device 190 to deliver voice messages and other audio (e.g., audible tones) to a location where the electronic device 190 is located in the operating environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing. When the electronic device 190 is a mobile device (e.g., a mobile phone or a tablet computer), its display screen is configured to display a notification concerning the state of audio input processing.

In some implementations, the electronic device 190 is a voice interface device that is network-connected to provide voice recognition functions with the aid of a voice assistance server 112 and/or optionally a cloud cast service server (not shown). For example, the electronic device 190 includes a smart speaker that provides music to a user and allows eyes-free and hands-free access to a voice assistant service (e.g., Google Assistant). Optionally, the electronic device 190 is one of a desktop or laptop computer, a tablet, a mobile phone that includes a microphone, a cast device that includes a microphone and optionally a speaker, an audio system (e.g., a stereo system, a speaker system, a portable speaker) that includes a microphone and a speaker, a television that includes a microphone and a speaker, and a user interface system in an automobile that includes a microphone and a speaker and optionally a display. Optionally, the electronic device 190 is a simple and low cost voice interface device. Generally, the electronic device 190 may be any device that is capable of network connection and that includes a microphone, a speaker, and programs, modules, and data for interacting with voice assistant service. Given simplicity and low cost of the electronic device 190, the electronic device 190 includes an array of light emitting diodes (LEDs) rather than a full display screen, and displays a visual pattern on the LEDs to indicate the state of audio input processing. In some implementations, the LEDs are full color LEDs, and the colors of the LEDs may be employed as a part of the visual pattern to be displayed on the LEDs. Multiple examples of using LEDs to display visual patterns in order to convey information or device status are described in U.S. Provisional Patent Application No. 62/336,566, entitled "LED Design Language for Visual Affordance of Voice User Interfaces," filed May 13, 2016, which is incorporated by reference in its entirety. In some implementations, visual patterns indicating the state of voice processing operations are displayed using characteristic images shown on conventional displays associated with electronic devices that are performing the voice processing operations.

In some implementations, LEDs or other visual displays are used to convey a collective voice processing state of multiple participating electronic devices. For example, in an operating environment where there are multiple voice processing or voice interface devices, groups of color LEDs associated with respective electronic devices can be used to convey which of the electronic devices is listening to a user, and which of the listening devices is the leader (where the "leader" device generally takes the lead in responding to a spoken request issued by the user).

More generally, the '566 application describes an "LED Design Language" for indicating visually using a collection of LEDs a variety of voice processing states of an electronic device, such as a "Hot word detection state and listening state," a "Thinking mode or working mode," and a "Responding mode or speaking mode." In some implementations, unique states of voice processing operations described herein are represented using a group of LEDs in accordance with one or more aspects of the "LED Design Language" of the '566 application. These visual indicators can also be combined with one or more audible indicators generated by electronic devices that are performing voice processing operations. The resulting audio and/or visual indicators will enable users in a voice-interactive environment to understand the state of various voice processing electronic devices in the environment and to effectively interact with those devices in a natural, intuitive manner.

When voice inputs from the electronic device 190 are used to control the media output devices via the cast devices, the electronic device 190 effectively enables a new level of control of cast-enabled media devices. In a specific example, the electronic device 190 includes a casual enjoyment speaker with far-field voice access and functions as a voice interface device for the voice assistant service. The electronic device 190 could be disposed in any area in the operating environment 100. When multiple electronic devices 190 are distributed in multiple rooms, they become cast audio receivers that are synchronized to provide voice inputs from all these rooms.

Specifically, in some implementations, the electronic device 190 includes a Wi-Fi speaker with a microphone that is connected to a voice-activated voice assistant service (e.g., Google Assistant). A user can issue a media play request via the microphone of electronic device 190, and ask the voice assistant service to play media content on the electronic device 190 itself or on another connected media output device. For example, the user can issue a media play request by saying to the Wi-Fi speaker "OK Google, play cat videos on my Living room TV." The voice assistant service then fulfils the media play request by playing the requested media content on the requested device using a default or designated media application.

In some implementations, a user can issue a voice request, via the microphone of the electronic device 190, concerning media content that has already been played or is being played on a display device (e.g., the user can ask for information about the media content, buy the media content through an online store, or compose and issue a social post about the media content).

In some implementations, a user may want to take a current media session with them as they move through the house and can request such a service from one or more of the electronic devices 190. This requires the voice assistant service to transfer the current media session from a first cast device to a second cast device that is not directly connected to the first cast device or has no knowledge of the existence of the first cast device. Subsequent to the media content transfer, a second output device coupled to the second cast device continues to play the media content previously a first output device coupled to the first cast device from the exact point within a music track or a video clip where play of the media content was forgone on the first output device. In some implementations, the electronic device 190 that receives the request to transfer the media session can satisfy the request. In some implementations, the electronic device 190 that receives the request to transfer the media session relays the request to another device or system (e.g., a hub device, voice assistance server 112) for handling.

Further, in some implementations, a user may issue, via the microphone of electronic device 190, a request for information or for performance of an action or operation. The information requested may be personal (e.g., the user's emails, the user's calendar events, the user's flight information, etc.), non-personal (e.g., sports scores, news stories, etc.) or somewhere in between (e.g., scores for teams or sports preferred by the user, news stories from the user's preferred sources, etc.). The requested information or action/operation may involve access to personal information (e.g., purchasing a digital media item with payment information provided by the user, purchasing a physical good). The electronic device 190 responds to the request with voice message responses to the user, where the response may include, for example, requests for additional information to fulfill the request, confirmation that the request has been fulfilled, notice that the request cannot be fulfilled, and so forth.

In some implementations, in addition to the voice-activated electronic devices 190 and the media devices (e.g., the output devices and the cast devices), the operating environment 100 may also include one or more smart home devices (not shown). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the operating environment 100 as a cast device and/or an output device, and therefore, is located in proximity to or with a known distance with respect to the cast device and the output device.

The smart home devices in the operating environment 100 may include, but are not limited to, one or more intelligent, multi-sensing, network-connected thermostats, one or more intelligent, network-connected, multi-sensing hazard detectors, one or more intelligent, multi-sensing, network-connected entryway interface devices and (hereinafter referred to as "smart doorbells" and "smart door locks"), one or more intelligent, multi-sensing, network-connected alarm systems, one or more intelligent, multi-sensing, network-connected camera systems, and one or more intelligent, multi-sensing, network-connected wall switches, and one or more intelligent, multi-sensing, network-connected power sockets. In some implementations, the smart home devices in the operating environment 100 of FIG. 1 includes a plurality of intelligent, multi-sensing, network-connected appliances (hereinafter referred to as "smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, any one of these smart home device types can be outfitted with microphones and one or more voice processing capabilities as described herein so as to in whole or in part respond to voice requests from an occupant or user.

In some implementations, each of the cast devices and the voice-activated electronic devices 190 is capable of data communications and information sharing with other cast devices, voice-activated electronic devices 190, smart home devices, a central server or cloud-computing system, and/or other devices (e.g., the client device) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Through the communication networks (e.g., the Internet) 110, the cast devices, the electronic devices 190 and the smart home devices may communicate with a server system (also called a central server system and/or a cloud-computing system herein). Optionally, the server system may be associated with a manufacturer, support entity, or service provider associated with the cast devices and the media content displayed to the user. Accordingly, the server system includes the voice assistance server 112 that processes audio inputs collected by voice-activated electronic devices 190, one or more content hosts 114 that provide the displayed media content, a cloud cast service server creating a virtual user domain based on distributed device terminals, and the device registry 118 that keeps a record of the distributed device terminals in the virtual user environment. Examples of the distributed device terminals include, but are not limited to the cast devices, the media output devices, the electronic devices 190 and the smart home devices. In some implementations, these distributed device terminals are linked to a user account (e.g., a Google user account) in the virtual user domain. It should be appreciated that processing of audio inputs collected by electronic devices 190 can be performed locally at an electronic device 190, at a voice assistance server 112, at another smart home device (e.g., a hub device) or at some combination of all or subset of the above.

It will be appreciated that in some implementations the electronic device(s) 190 also function in an environment without smart home devices. For example, an electronic device 190 can, even in the absence of smart home devices, respond to user requests for information or performance of an action, and/or to initiate or control various media play functions. An electronic device 190 can also function in a wide range of environments, including, without limitation, a vehicle, a ship, a business, or a manufacturing environment.

In some implementations, an electronic device 190 is "awakened" (e.g., to activate an interface for the voice assistant service on the electronic device 190, to put the electronic device 190 into a state where the electronic device 190 is ready to receive voice requests to the voice assistant service) by a voice input that includes a hotword (also called a "wake word"). In some implementations, the electronic device 190 requires awakening if the electronic device 190 has been idle with respect to receipt of voice inputs for at least a predefined amount of time (e.g., 5 minutes); the predefined amount of time corresponds to an amount of idle time allowed before a voice interface session or conversation times out. The hotword may be a word or phrase, and may be a predefined default and/or may be customized by a user (e.g., a user may set a nickname for a particular electronic device 190 as the device's hotword). In some implementations, there may be multiple hotwords that can awaken an electronic device 190. A user may speak the hotword, wait for an acknowledgement response from the electronic device 190 (e.g., the electronic device 190 outputs a greeting), and them make a first voice request. Alternatively, the user may combine the hotword and the first voice request in one voice input (e.g., the voice input includes the hotword followed by the voice request).

In some implementations, the voice inputs spoken by the user to an electronic device 190 may generally be freeform or natural language speech. That is, the voice input need not be strictly limited to a predefined set of words and phrases within a predefined syntax, with possibly certain exceptions (e.g., user needs to speak the hotword first to awaken the device).

In some implementations, an electronic device 190 includes one or more additional ways or affordances to wake up the device besides speaking the hotword to the electronic device 190. The additional ways or affordances may include, for example, activating a predefined button or touch sensor (e.g., a touch sense array) on the electronic device 190.

In some implementations, a voice-activated electronic device 190 interacts with a cast device, a client device, or a server system of an operating environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to a voice assistance server 112 via the communication networks 110 for further processing. The cast device is configured to obtain media content or Internet content from one or more content hosts 114 for display on an output device coupled to the cast device. In some implementations, the cast device and the voice-activated electronic device 190 are linked to each other in a user domain, and more specifically, associated with each other via a user account in the user domain. Information of the cast device and information of the electronic device 190 are stored in the device registry 118 in association with the user account. In some implementations, there is a device registry for cast devices and a registry for voice-activated electronic devices 190. In some implementations, a cloud cast service server manages the cast devices registry and the voice assistance server 112 manages the voice-activated electronic devices registry. The cast devices registry may reference devices in the voice-activated electronic devices registry that are associated in the user domain, and vice versa.

In some implementations, one or more of the electronic devices 190 (and one or more cast devices) are commissioned to the voice assistant service via a client device (not shown). In some implementations, the voice-activated electronic device 190 does not include any display screen, and relies on the client device to provide a user interface during a commissioning process, and similarly for a cast device as well. Specifically, the client device is installed with an application that enables a user interface to facilitate commissioning of a new voice-activated electronic device 190 disposed in proximity to the client device. A user may send a request on the user interface of the client device to initiate a commissioning process for the new electronic device 190 that needs to be commissioned. After receiving the commissioning request, the client device establishes a short range communication link with the new electronic device 190 that needs to be commissioned. Optionally, the short range communication link is established based near field communication (NFC), Bluetooth, Bluetooth Low Energy (BLE) and the like. The client device then conveys wireless configuration data associated with a wireless local area network (WLAN) (e.g., local network 104) to the new or electronic device 190. The wireless configuration data includes at least a WLAN security code (i.e., service set identifier (SSID) password), and optionally includes a SSID, an Internet protocol (IP) address, proxy configuration and gateway configuration. After receiving the wireless configuration data via the short range communication link, the new electronic device 190 decodes and recovers the wireless configuration data, and joins the WLAN based on the wireless configuration data.

In some implementations, additional user domain information is entered on the user interface displayed on the client device, and used to link the new electronic device 190 to an account in a user domain. Optionally, the additional user domain information is conveyed to the new electronic device 190 in conjunction with the wireless communication data via the short range communication link. Optionally, the additional user domain information is conveyed to the new electronic device 190 via the WLAN after the new device has joined the WLAN.

Once the electronic device 190 has been commissioned into the user domain, other devices and their associated activities may be controlled via multiple control paths. In accordance with one control path, an application installed on the client device is used to control the other device and its associated activities (e.g., media play activities). Alternatively, in accordance with another control path, the electronic device 190 is used to enable eyes-free and hands-free control of the other device and its associated activities.

In some implementations, after the cast device and the voice-activated electronic device 190 are both commissioned and linked to a common user domain, the voice-activated electronic device 190 can be used as a voice user interface to enable eyes-free and hands-free control of media content streaming to the cast device involving no remote control, client device or other second screen device. For example, the user may give voice commands such as "Play Lady Gaga on Living Room speakers." A Lady Gaga music track or video clip is streamed to a cast device associated with the "Living Room speakers." The client device is not involved, nor is any cast device application or media play application loaded on the client device.

In some implementations, a proxy service (e.g., voice assistant service, a cloud cast service) communicatively links the voice-activated electronic device 190 to the cast device and makes casting to the cast device possible without involving any applications on the client device. Specifically, a voice message is captured and recorded by an electronic device 190, and the voice message is configured to request media play on a media output device. Optionally, the electronic device 190 partially processes the voice message locally. Optionally, the electronic device 190 transmits the voice message or the partially processed voice message to a voice assistance server 112 via the communication networks 110 for further processing. The voice assistance server 112 or a cloud cast service server determines that the voice message includes a first media play request, and that the first media play request includes a user voice command to play media content on a media output device and a user voice designation of the media output device. The user voice command further includes at least information of a first media play application (e.g., YouTube and Netflix) and the media content (e.g., Lady Gaga music) that needs to be played.

In accordance with the voice designation of the media output device, the voice assistance server 112 or the cloud cast service server identifies in a device registry 118 a cast device associated in the user domain with the electronic device 190 and coupled to the media output device. The cast device is configured to execute one or more media play applications for controlling the media output device to play media content received from one or more media content hosts 114. Then, the cloud cast service server sends to the cast device a second media play request including the information of the first media play application and the media content that needs to be played. Upon receiving the information sent by the cloud cast service server, the cast device executes the first media play application and controls the media output device to play the requested media content.

In some implementations, the user voice designation of the media output device includes a description of the destination media output device. The voice assistance server 112 or the cloud cast service server identifies in the device registry 118 the destination media output device among a plurality of media output devices according to the description of the destination media output device. In some implementations, the description of the destination media output device includes at least a brand ("Samsung TV") or a location of the media output device ("my Living Room TV").

In some implementations, the operating environment 100 includes a first cast device (not shown) and a first output device (not shown) coupled to the first cast device. The operating environment 100 also includes a second cast device (not shown) and a second output device (not shown) coupled to the second cast device. The cast devices are optionally located in the same location (e.g., the living room) or two distinct locations (e.g., two rooms) in the operating environment 100. Each of the cast devices is configured to obtain media content or Internet content from content hosts 114 for display on the output device coupled to the respective cast device. Both the first and second cast devices are communicatively coupled to the voice assistance server 112, optionally a cloud cast service server, and the content hosts 114.

The operating environment 100 further includes one or more voice-activated electronic devices 190 that are communicatively coupled to the voice assistance server 112 and optionally the cloud cast service server. In some implementations, the voice-activated electronic devices 190 are disposed independently of the cast devices and the output devices. For example, an electronic device 190 is disposed in a room where no cast device or output device is located. In some implementations, a first electronic device 190 is disposed in proximity to the first cast device and the first output device, e.g., the first electronic device 190, the first cast device and the first output device are located in the same room. Optionally, a second electronic device 190 is disposed independently of or in proximity to the second cast device and the second output device.

When media content is being played on the first output device, a user may send a voice command to any of the electronic devices 190 to request play of the media content to be transferred to the second output device. The voice command includes a media play transfer request. In one situation, the user can issue the voice command to the electronic device 190 disposed in proximity to the first cast device before the user moves to a destination location. Alternatively, in another situation, the user can issue the voice command to the electronic device 190 disposed in proximity to the second device after the user reaches the destination location.

The voice command is transmitted to the voice assistance server 112. The voice assistance server 112 sends a media display information request to the first cast device to request instant media play information of the media content that is currently being played on the first output device coupled to the first cast device. The first cast device then returns to the voice assistance server 112 the requested instant play information including at least information of a first media play application (e.g., YouTube), the media content that is currently being played (e.g., "Lady Gaga-National Anthem-Super Bowl 2016"), and a temporal position related to playing of the media content. The second cast device then receives a media display request including the instant play information from the voice assistance server 112, and in accordance with the instant play information, executes the first media play application that controls the second output device to play the media content from the temporal location.

For example, when a music playlist is played on the first output device, the user says "Play on my living room speakers." The first output device stops playing the currently played song, and the stopped song resumes on the living room speakers. When the song is completed, the living room speakers continue to play the next song on the music playlist previously played on the first output device. As such, when the user is moving around in the operating environment 100, the play of the media content would seamlessly follow the user while only involving limited user intervention (i.e., giving the voice command).

Figure 2A:
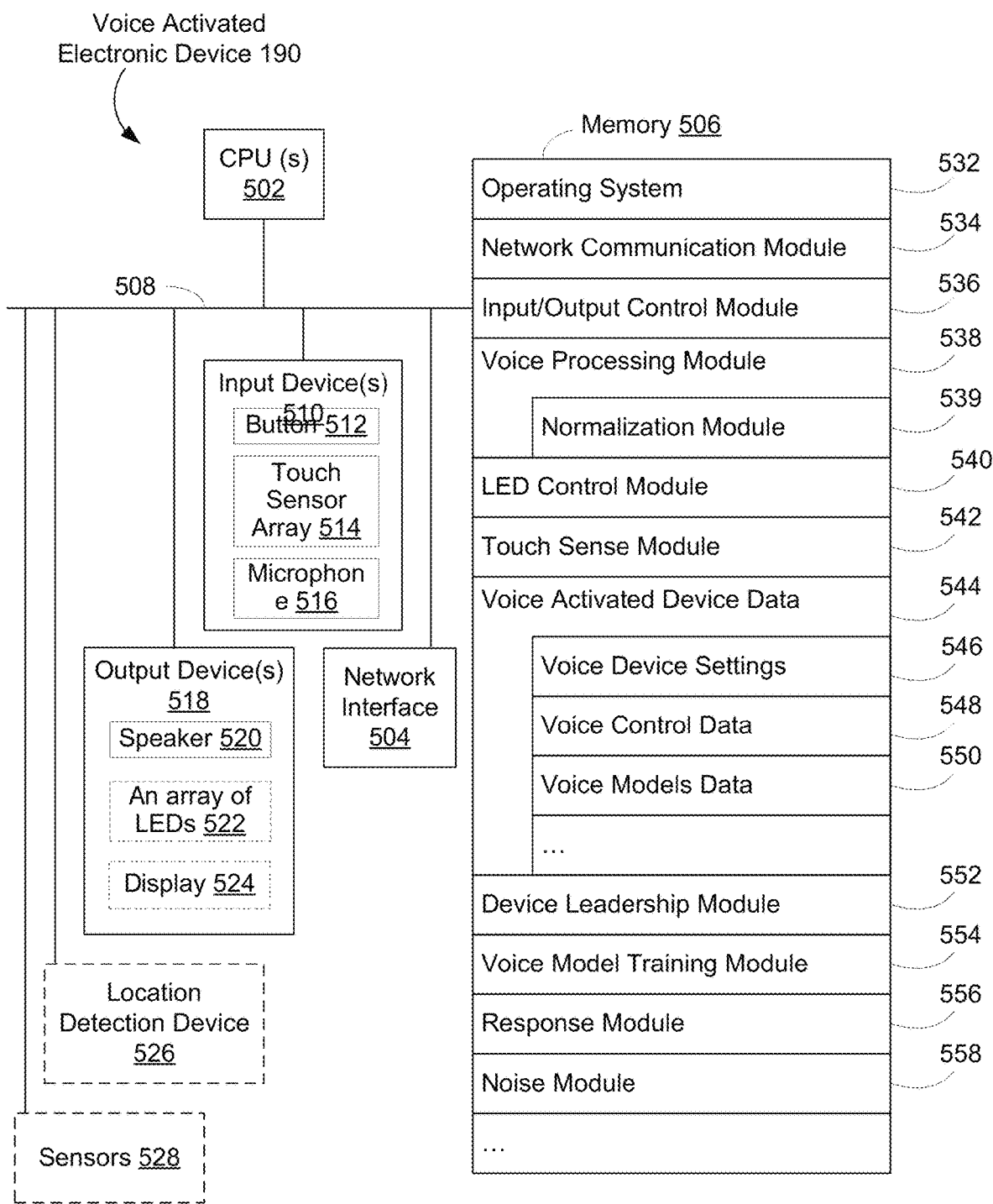
FIGS. 2A-2B are block diagrams illustrating an example electronic device that is applied as a voice interface to collect user voice commands in an operating environment in accordance with some implementations.
Figure 2B:
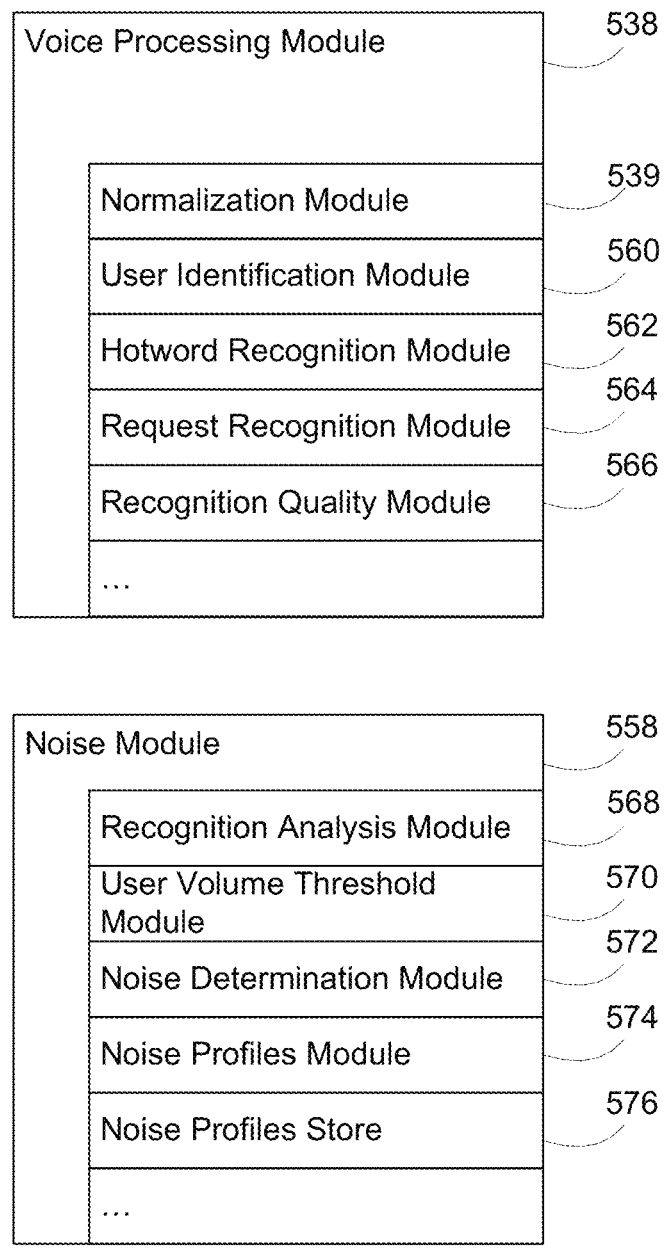

FIGS. 2A-2B are block diagrams illustrating an example electronic device 190 that is applied as a voice interface to collect user voice commands in an operating environment (e.g., operating environment 100) in accordance with some implementations. The electronic device 190 includes one or more processing units (CPUs) 502, one or more network interfaces 504, memory 506, and one or more communication buses 508 for interconnecting these components (sometimes called a chipset). The electronic device 190 includes one or more input devices 510 that facilitate user input, such as a button 512, a touch sense array 514, and one or more microphones 516. The electronic device 190 also includes one or more output devices 518, including one or more speakers 520, optionally an array of LEDs 522, and optionally a display 524. In some implementations, the array of LEDs 522 is an array of full color LEDs. In some implementations, an electronic device 190, depending on the type of device, has either the array of LEDs 522, or the display 524, or both. In some implementations, the electronic device 190 also includes a location detection device 526 (e.g., a GPS module) and one or more sensors 528 (e.g., accelerometer, gyroscope, light sensor, etc.).

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer-readable storage medium. In some implementations, memory 506, or the non-transitory computer-readable storage medium of memory 506, stores the following programs, modules, and data structures, or a subset or superset thereof:
- an operating system 532 including procedures for handling various basic system services and for performing hardware dependent tasks;
- a network communication module 534 for connecting the electronic device 190 to other devices (e.g., the server system 140, one or more cast devices, one or more client devices, one or more smart home devices, and other electronic device(s) 190) via one or more network interfaces 504 (wired or wireless) and one or more networks 110, such as the Internet, other wide area networks, local area networks (e.g., local network 104), metropolitan area networks, and so on;
- an input/output control module 536 for receiving inputs via one or more input devices and enabling presentation of information at the electronic device 190 via one or more output devices 518, including:
  - a voice processing module 538 for processing audio inputs or voice messages collected in an environment surrounding the electronic device 190, or preparing the collected audio inputs or voice messages for processing at a voice assistance server 112, including but not limited to:
    - a normalization module 539 for normalizing audio data (e.g., received at the microphone 516) to produce feature vectors (e.g., for speech/hotword recognition), such as a PCEN, PCAN, or PCEN-like PCAN module as described below in the audio processing section of this disclosure;
  - an LED control module 540 for generating visual patterns on the LEDs 522 according to device states of the electronic device 190; and
  - a touch sense module 542 for sensing touch events on a top surface (e.g., on touch sensor array 514) of the electronic device 190;
- Voice activated device data 544 for storing at least data associated with the electronic device 190, including but not limited to:
  - Voice device settings 546 for storing information associated with the electronic device 190 itself, including common device settings (e.g., service tier, device model, storage capacity, processing capabilities, communication capabilities, etc.), information of one or more user accounts in a user domain, settings regarding restrictions when dealing with a non-registered user, and display specifications associated with one or more visual patterns displayed by the LEDs 522;
  - Voice control data 548 for storing audio signals, voice messages, response messages and other data related to voice interface functions of the electronic device 190;
  - Voice models data 550 for storing voice models or voice fingerprints corresponding to users in the user domain that are associated with the electronic device 190;
- a device leadership module 552 for determining a leader amongst multiple electronic devices 190 in response to user voice inputs;
- a voice model training module 554 for training and generating voice models or voice fingerprints 550 that can be used to identify and disambiguate users in the user domain that are associated with the electronic device 190;
- a response module 556 for performing instructions included in voice request responses generated by the voice assistance server 112, and in some implementations, generating responses to certain voice inputs; and
- a noise module 558 for determining noise levels around the electronic device 190 and provide indications of interfering noise levels and hints to use alternative ways to wake up the electronic device.

In some implementations, the voice processing module 538 includes one or more of the following modules:
- a normalization module 539 for normalizing audio data to produce feature vectors;
- a user identification module 560 for identifying and disambiguating users who provide voice inputs to the electronic device 190;
- a hotword recognition module 562 for determining whether voice inputs include a hotword for waking up the electronic device 190 and recognizing such in the voice inputs;
- a request recognition module 564 for determining a user request included in a voice input; and
- a recognition quality module 566 for determining a measure of the quality (e.g., a score) of recognition of hotwords and/or requests in voice inputs.

In some implementations, the noise module 558 includes the following modules:
- a recognition analysis module 568 for analyzing how different levels of noise affect the operations of the voice processing module 538 (e.g., in particular the hotword recognition module 562 and/or the request recognition module 564) with respect to the particular electronic device 190;
- a user volume threshold module 568 for determining, for a given distance from the electronic device 190, highest comfortable volume levels at which users will utter voice inputs to the electronic device, 190;
- a noise determination module 572 for determining a noise level and a noise profile around the electronic device 190;
- a noise profiles module 574 for training and generating noise profiles of noises that interfere with recognition of hotwords and/or requests in voice inputs; and
- a noise profiles store 576 for storing noise profiles that have been determined to be interfering.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above. In some implementations, a subset of the programs, modules, and/or data stored in the memory 506 can be stored on and/or executed by the server system 140/voice assistance server 112.

In some implementations, one or more of the modules in memory 506 described above are part of a voice processing library of modules. The voice processing library may be implemented and embedded on a wide variety of devices. An example of a voice processing library is described in U.S. Provisional Patent Application No. 62/334,434, entitled "Implementations for Voice Assistant on Devices," filed May 10, 2016, which is incorporated by reference in its entirety.

Figure 3:
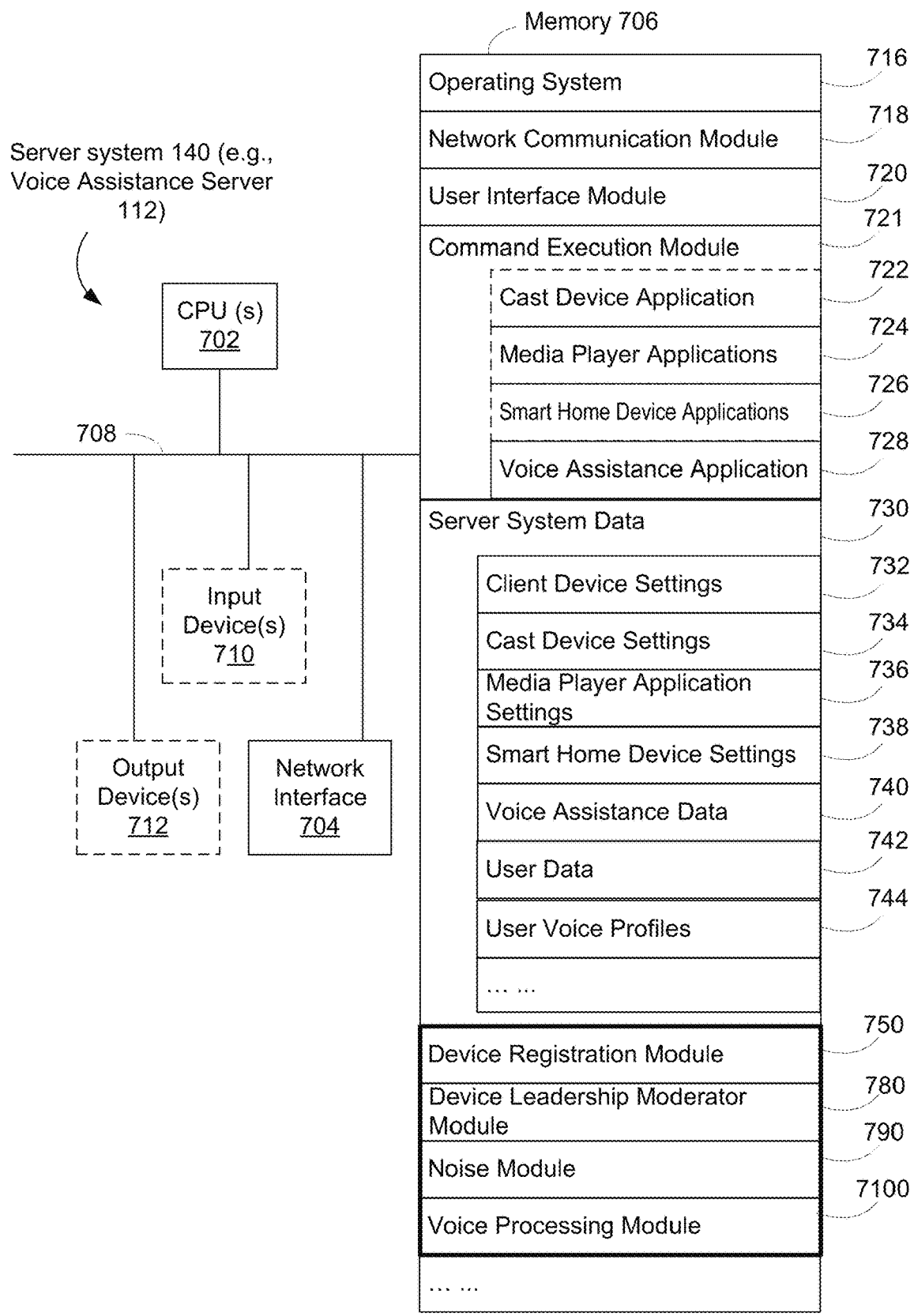
FIG. 3 is a block diagram illustrating an example server in the server system of an operating environment in accordance with some implementations.

FIG. 3 is a block diagram illustrating an example server in the server system 140 of an operating environment (e.g., operating environment 100) in accordance with some implementations. An example server is one of a voice assistance server 112. The server 140, typically, includes one or more processing units (CPUs) 702, one or more network interfaces 704, memory 706, and one or more communication buses 708 for interconnecting these components (sometimes called a chipset). The server 140 could include one or more input devices 710 that facilitate user input, such as a keyboard, a mouse, a voice-command input unit or microphone, a touch screen display, a touch-sensitive input pad, a gesture capturing camera, or other input buttons or controls. Furthermore, the server 140 could use a microphone and voice recognition or a camera and gesture recognition to supplement or replace the keyboard. In some implementations, the server 140 includes one or more cameras, scanners, or photo sensor units for capturing images, for example, of graphic series codes printed on the electronic devices. The server 140 could also include one or more output devices 712 that enable presentation of user interfaces and display content, including one or more speakers and/or one or more visual displays.

The memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 706, optionally, includes one or more storage devices remotely located from one or more processing units 702. The memory 706, or alternatively the non-volatile memory within the memory 706, includes a non-transitory computer-readable storage medium. In some implementations, the memory 706, or the non-transitory computer-readable storage medium of the memory 706, stores the following programs, modules, and data structures, or a subset or superset thereof:

- an operating system 716 including procedures for handling various basic system services and for performing hardware dependent tasks;
- a network communication module 718 for connecting the server system 140 to other devices (e.g., various servers in the server system 140, client devices, cast devices, electronic devices 190, and smart home devices) via one or more network interfaces 704 (wired or wireless) and one or more networks 110, such as the Internet, other wide area networks, local area networks, metropolitan area networks, and so on;
- a user interface module 720 for enabling presentation of information (e.g., a graphical user interface for presenting application(s) 826-830, widgets, websites and web pages thereof, and/or games, audio and/or video content, text, etc.) at a client device;
- a command execution module 721 for execution on the server side (e.g., games, social network applications, smart home applications, and/or other web or non-web based applications for controlling a client device, cast devices, an electronic device 190 and a smart home devices and reviewing data captured by such devices), including one or more of:
  - a cast device application 722 that is executed to provide server-side functionalities for device provisioning, device control, and user account management associated with cast device(s);
  - one or more media player applications 724 that is executed to provide server-side functionalities for media display and user account management associated with corresponding media sources;
  - one or more smart home device applications 726 that is executed to provide server-side functionalities for device provisioning, device control, data processing and data review of corresponding smart home devices; and
  - a voice assistance application 728 that is executed to arrange voice processing of a voice message received from the electronic device 190 or directly process the voice message to extract a user voice command and one or more parameters for the user voice command (e.g., a designation of a cast device or another electronic device 190); and
- Server system data 730 storing at least data associated with automatic control of media display (e.g., in an automatic media output mode and a follow-up mode), including one or more of:
  - Client device settings 732 for storing information associated with one or more client device, including common device settings (e.g., service tier, device model, storage capacity, processing capabilities, communication capabilities, etc.), and information for automatic media display control;
  - Cast device settings 734 for storing information associated with user accounts of the cast device application 722, including one or more of account access information, information for device settings (e.g., service tier, device model, storage capacity, processing capabilities, communication capabilities, etc.), and information for automatic media display control;
  - Media player application settings 736 for storing information associated with user accounts of one or more media player applications 724, including one or more of account access information, user preferences of media content types, review history data, and information for automatic media display control;
  - Smart home device settings 738 for storing information associated with user accounts of the smart home applications 726, including one or more of account access information, information for one or more smart home devices (e.g., service tier, device model, storage capacity, processing capabilities, communication capabilities, etc.);
  - Voice assistance data 740 for storing information associated with user accounts of the voice assistance application 728, including one or more of account access information, information for one or more electronic device 190 (e.g., service tier, device model, storage capacity, processing capabilities, communication capabilities, etc.);
  - User data 742 for storing information associated with users in the use domain, including users' subscriptions (e.g., music streaming service subscriptions, video streaming service subscriptions, newsletter subscriptions), user devices (e.g., devices registered in the device registry 118 associated with respective users), user accounts (e.g., users' email accounts, calendar accounts, financial accounts), and other user data; and
  - User voice profiles 744 for storing voice profiles of the users in the user domain, including, for example, voice models or voice fingerprints of the users and comfortable volume level thresholds of the users.

- a device registration module 750 for managing the device registry 118 coupled to the voice assistance server 112;
- a device leadership moderator module 780 for moderating device leadership determinations between the electronic devices 190 in the operating environment;
- a noise module 790 for determining noise levels around the electronic device 190; and
- a voice processing module 7100 for processing audio inputs or voice messages collected in an environment surrounding the electronic device 190.

In some implementations, the voice assistance server 112 performs processing of voice inputs and for noise mitigation, and thus one or more of the programs, modules, and data structures in the memory 506 described above with reference to FIGS. 2A-2B are included in respective modules in the memory 706 (e.g., the programs, modules, and data structures included with the voice processing module 538 are included in the voice processing module 7100, and the programs, modules, and data structures included with the noise module 558 are included in the noise module 790). The electronic device 190 either transmits captured voice inputs to the voice assistance server 112 for processing, or first pre-processes the voice inputs and transmits the pre-processed voice inputs to the voice assistance server 112 for processing. In some implementations, the voice assistance server 112 and the electronic device 190 has some shared and some divided responsibilities regarding processing of voice inputs and noise mitigation, and the programs, modules, and data structures shown in FIGS. 2A-2B may be included in both or divided amongst the voice assistance server 112 and the electronic device 190. Other programs, modules, and data structures shown in FIGS. 2A-2B (e.g., voice models data 550, voice model training module 554), or analogues thereof, may also be included in the voice assistance server 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Audio Processing

In some implementations, the PCEN frontend (e.g., in the voice processing module 538) applies a dynamic compression shown in Equation (1) below (e.g., in replace of a static log (or root) compression):

$$PCEN(t, f) = \left(\frac{E(t, f)}{(\epsilon + M(t, f))^\alpha} + \delta\right)^r - \delta^r \quad \text{Equation 1}$$

PCEN compression

Equation 1—PCEN Compression

In Equation 1, t and f denote time and frequency index and E(t, f) denotes filterbank energy in each time-frequency (T-F) bin. $\epsilon$ is a small constant to prevent division by zero. For example, in accordance with some implementations, $\epsilon$ is set to $10^{-6}$. In some implementations, $\delta$ is in the range of 0.1 to 10. In some implementations, r is in the range of 0.25 to 0.6.

In some implementations, an FFT-based mel-scale filterbank is used. The mel scale relates perceived frequency, or pitch, of a pure tone to its actual measured frequency. Converting to mel scale enables features to match more closely to what humans hear since humans are better at discerning small changes in pitch at low frequencies than they are at high frequencies.

The formula for converting from frequency to mel scale is:

$$M(f) = 1125 \ln\left(1 + \frac{f}{700}\right) \quad \text{Equation 2}$$

Mel scale conversion

Referring back to Equation 1, M(t, f) is a smoothed version of the filterbank energy E(t, f) and is computed using a first-order infinite impulse response (IIR) filter, such as shown below in Equation 3.

$$M(t,f) = (1-s)M(t-1,f) + sE(t,f)$$

Equation 3—Infinite Impulse Response Filter

In Equation 3, s is a smoothing coefficient (e.g., in the range of [0,1)).

$$E(t,f)/(\epsilon + M(t,f))^\alpha$$

Equation 4—Automatic Gain Control

Equation 4, implementing part of Equation 3, comprises a form of feed-forward automatic gain control (AGC). The AGC strength (or gain normalization strength) is controlled by the parameter $\alpha \in [0,1]$, where a larger $\alpha$ indicates stronger gain normalization. In some implementations, $\alpha$ is in the range of 0.5 to 1.0. In some implementations, due to smoothing, M(t, f) carries the loudness profile of E(t, f), which is subsequently normalized out. In some implementations, this operation is causal and is done for each frequency channel (frequency bin) independently, making it suitable for real-time implementation. The AGC emphasizes changes relative to recent spectral history and adapts to audio communication channel effects, including loudness.

In some implementations, following the AGC, a stabilized root compression is performed to further reduce the dynamic range using offset $\delta$ and exponent r. The offset $\delta$ introduces a flat start to the stabilized root compression curve, which resembles an optimized spectral subtraction curve. In some implementations, the AGC strength $\alpha$ and smoothing coefficient s are based on the loudness distribution of data.

Figure 4A:
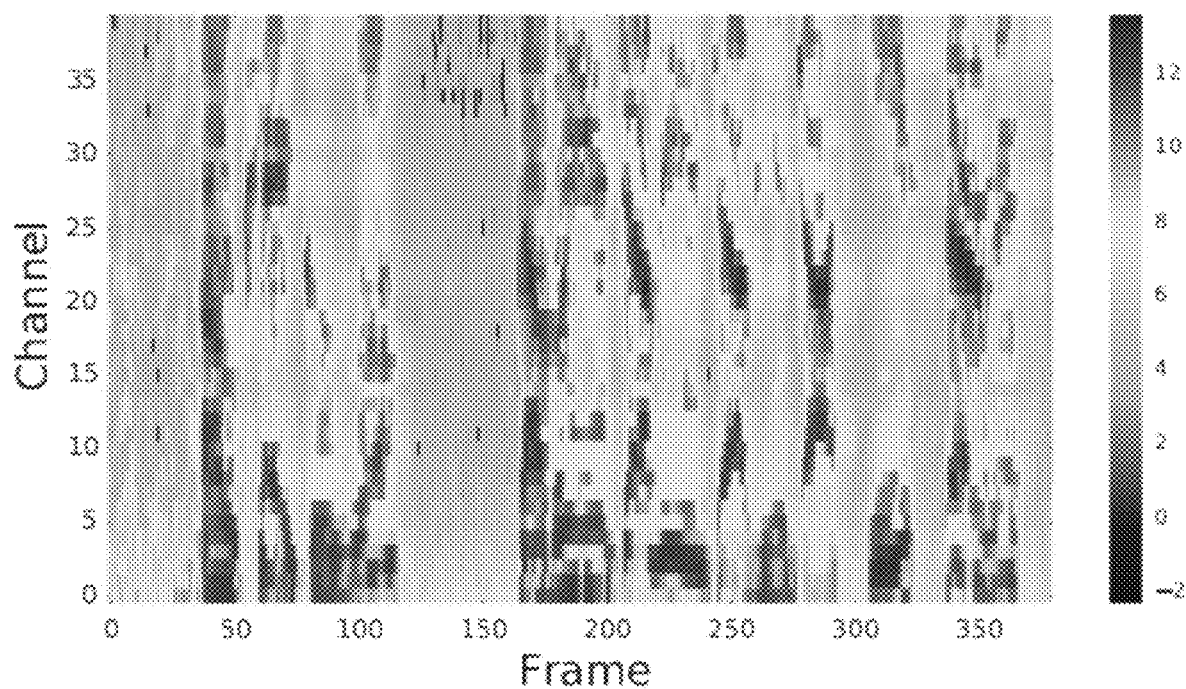
FIGS. 4A-4B show a prophetic comparison of frequency channel outputs with log-mel and PCEN frontends, in accordance with some implementations.
Figure 4B:
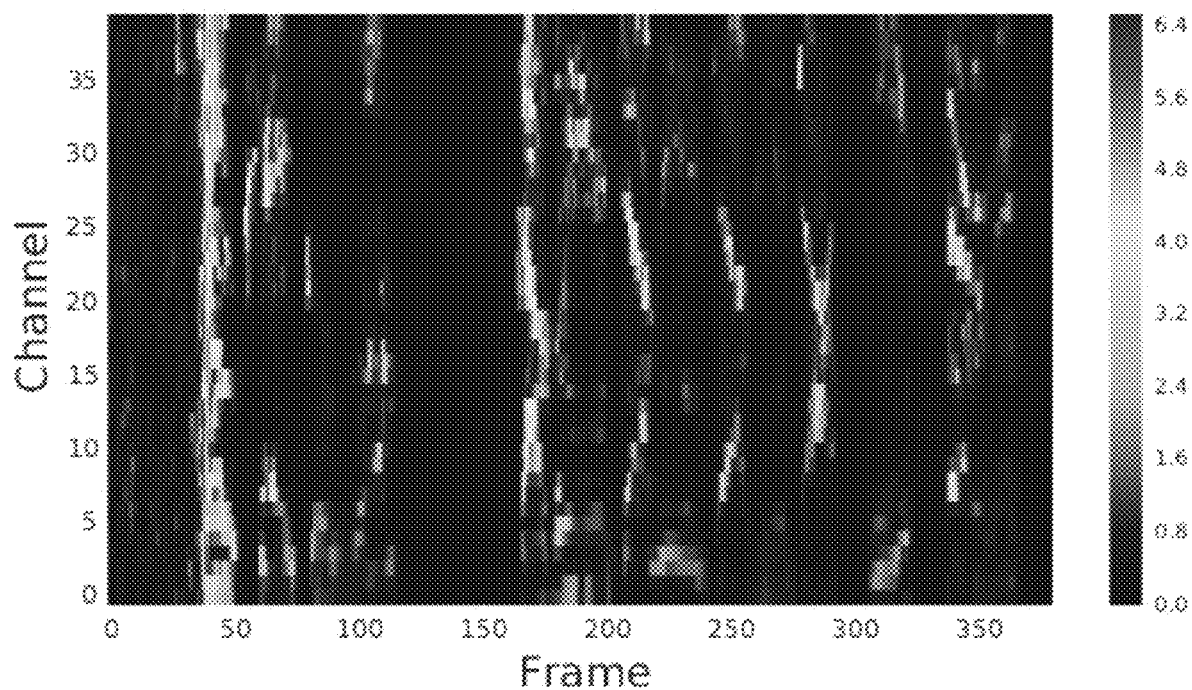

FIGS. 4A-4B show a prophetic comparison of frequency channel outputs with log-mel and PCEN frontends, in accordance with some implementations. For example in accordance with some implementations, s=0.025, $\alpha$=0.98, $\delta$=2 and r=0.5, where s=0.025 translates to a 40-frame time constant for the IIR smoother. In this example, the PCEN reduces the dynamic range of filterbank energy while still preserving prominent speech patterns. In several intervals (e.g., the first 30 frames and frame 120 to 170), low-level signals that do not carry useful information are amplified by the log operation, whereas in PCEN they are relatively flat.

In addition, the PCEN enhances speech onsets, which are important for noise and reverberation robustness.

Equation 4 can be written as:

$$\exp(\log(E(t,f) - \alpha \log(\epsilon + M(t,f))))$$

Equation 5—Automatic Gain Control Expressed with Log Function

As shown in Equation 5, in accordance with some implementations, the PCEN frontend is performing a partial log-domain high-pass filtering followed by an exponential expansion, which helps enhance transitions.

As can be seen in Equation 1, in accordance with some implementations, the PCEN frontend incorporates several tunable parameters. Manual tuning is a labor intensive and inherently suboptimal process. For example, when one wants to jointly tune all parameters with a moderate resolution, the number of parameter combinations can easily become unmanageable. In accordance with some implementations, all the PCEN operations are differentiable, permitting gradient-based optimization with respect to hyperparameters.

Gain normalization related parameters include $\alpha$, $\delta$, and r. In accordance with some implementations, the PCEN is expressed as matrix operations, hence representable with standard neural network layers, by utilizing precomputed filterbank energy E and corresponding smoother M (t, f). In some implementations, the PCEN layer outputs are feed to a neural network (e.g., as features to a KWS acoustic model) and jointly optimized. In some implementations, to account for a KWS acoustic model loss function, a gradient is computed using backpropagation with respect to those parameters. In some implementations, the parameters are updated iteratively using stochastic gradient descent (SGD). In some implementations, to ensure parameter positivity, gradient updates are performed on their log values and then exponentials are taken.

The neural-network formulation offers more than automatic parameter finding. In some implementations, the parameters of Equation 1 are restricted to be scalars shared across all T-F bins and are manually tuned (e.g., due to difficulties in designing high dimensional parameters). With a neural-network-based formulation, in some implementations the PCEN parameters are generalized to be frequency- or time-frequency dependent. In some implementations, an SGD is utilized to optimize the PCEN parameter values automatically.

In some implementations, a similar approach is used to produce a smoother M (t, f) as well. In some implementations, the smoothing coefficient s, which controls the time constant of the IIR smoother, is learned utilizing a neural network. In some implementations, the smoother is modeled as a recurrent neural network with a trainable s. In some implementations, several smoothing coefficients are predetermined and a weighted combination of several smoother outputs is learned. In some implementations, a frequency-dependent convex combination is learned as shown in Equation 6:

$$M(f) = \Sigma_{k=1}^{k} w_k(f) M_k(f) \text{ such that } w_k(f) \geq 0 \text{ and } \Sigma_{k=1}^{k} w_k(f) = 1$$

Equation 6—Smoother Output Combination

In Equation 6, K is the number of smoothers. In some implementations, the constraints in Equation 6 are satisfied by computing $w_k(f)$ as:

$$\exp(z_k(f))/\Sigma_k \exp(z_k(f)) \text{ where } z_k(f) \in \mathbb{R}$$

Equation 7—Smoother Weighting Function

In some implementations, similar to above, a gradient with respect to all $z_k(f)$ is computed and updated iteratively.

Figure 5:
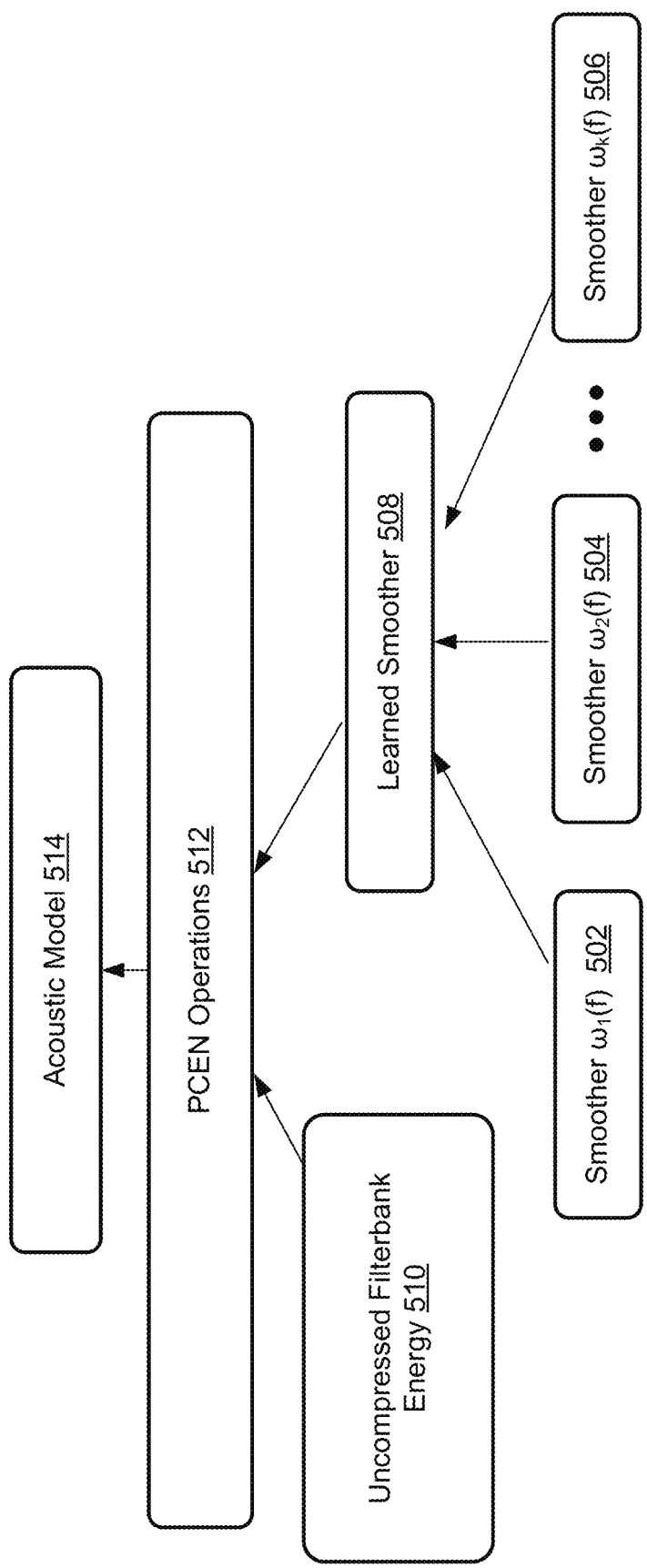
FIG. 5 is a block diagram illustrating a PCEN frontend and KWS model, in accordance with some implementations.

FIG. 5 illustrates the joint PCEN frontend and KWS model. In accordance with some implementations, each smoother $w_k(f)$ (e.g., 502, 504, and 506) is used to generate a learned smoother 508 (e.g., as described above with respect to Equations 6-7). In accordance with some implementations, the learned smoother 508 and the uncompressed filterbank energy 510 is input to the PCEN 512 to generate an acoustic model 514 (e.g., as described above with respect to Equations 1-5). In some implementations, all the trainable parameters are data-independent, and are not conditioned on any input features, such that they are the "leaf" nodes in the computation graph. In some implementations, after training, the learned parameters are frozen and do not change for different signals. This avoids introducing additional network weights and computational cost during inference, because the trained parameters are hardcoded into the PCEN frontend. In some implementations, data-dependent parameter learning is used to further improve performance.

In some implementations, the KWS system uses a convolutional neural network (CNN). In some implementations, the input to the CNN includes multiple left context frames and multiple right context frames (e.g., 23 left frames and 8 right frames for 32 frames in total). In accordance with some implementations, for both log-mel and PCEN frontend, each frame is computed based on a 40-channel mel filterbank (e.g., with 25 ms windowing and 10 ms frame shift). In some implementations, the CNN includes a convolutional layer with hundreds of feature maps (e.g., 308 feature maps) and non-overlapping kernels (e.g., 8×8 kernels) followed by a linear projection layer (e.g., of size 32) and a fully connected rectified linear unit layer (e.g., of size 128). In some implementations, the CNN is trained on large internal training sets to detect a keyword (e.g., a keyword such as "Ok Google").

To improve noise robustness, in some implementations, multi-condition training is performed by artificially corrupting each utterance with various interfering background noises and reverberations. In some implementations, the noise sources contain sounds sampled from daily-life environments and videos (e.g., YouTube™ videos). To further improve loudness robustness, in some implementations, multi-loudness training is performed by scaling the loudness of each training utterance to a randomly selected level (e.g., ranging from −45 decibels relative to full scale (dBFS) to −15 dBFS).

In some implementations, far-field evaluation sets rerecorded in real environments (such as a moving car or a living room) are utilized to train the PCEN. In some implementations, the negative data in these sets include speech signals mined from real voice search logs. In various implementations, the size of the evaluation sets range from 50 to 300 hours. In some implementations, there is no overlapping condition between the training and evaluation sets. The data used in training and evaluation sets is anonymized. In accordance with some implementations, low false rejection rates are achieved (e.g., less than 0.5 per hour of audio) while maintaining extremely low false alarm rates (e.g., no more than 0.5 false alarms per hour of audio).

In some implementations, $\alpha(f)$, $\delta(f)$, and $r(f)$ are randomly initialized from a normal distribution (e.g., with mean 1:0 and standard deviation 0.1). In some implementations, $z_k(f)$ is randomly initialized from a normal distribution with mean log(1/K) and standard deviation 0.1, where K is a number of predetermined smoothers. In some implementations, four smoothers are calculated using smoothing coefficients of 0.015, 0.02, 0.04, and 0.08. In accordance with some implementations, the learned weights are mostly assigned to the slowest and fastest smoothers, that is s=0.015 and s=0.08.

In some implementations, to effectively training PCEN, multi-loudness training data is utilized, such that the network can learn the importance of gain normalization. In some implementations, the KWS CNN layers are bootstrapped from a pretrained PCEN model.

Figure 6:
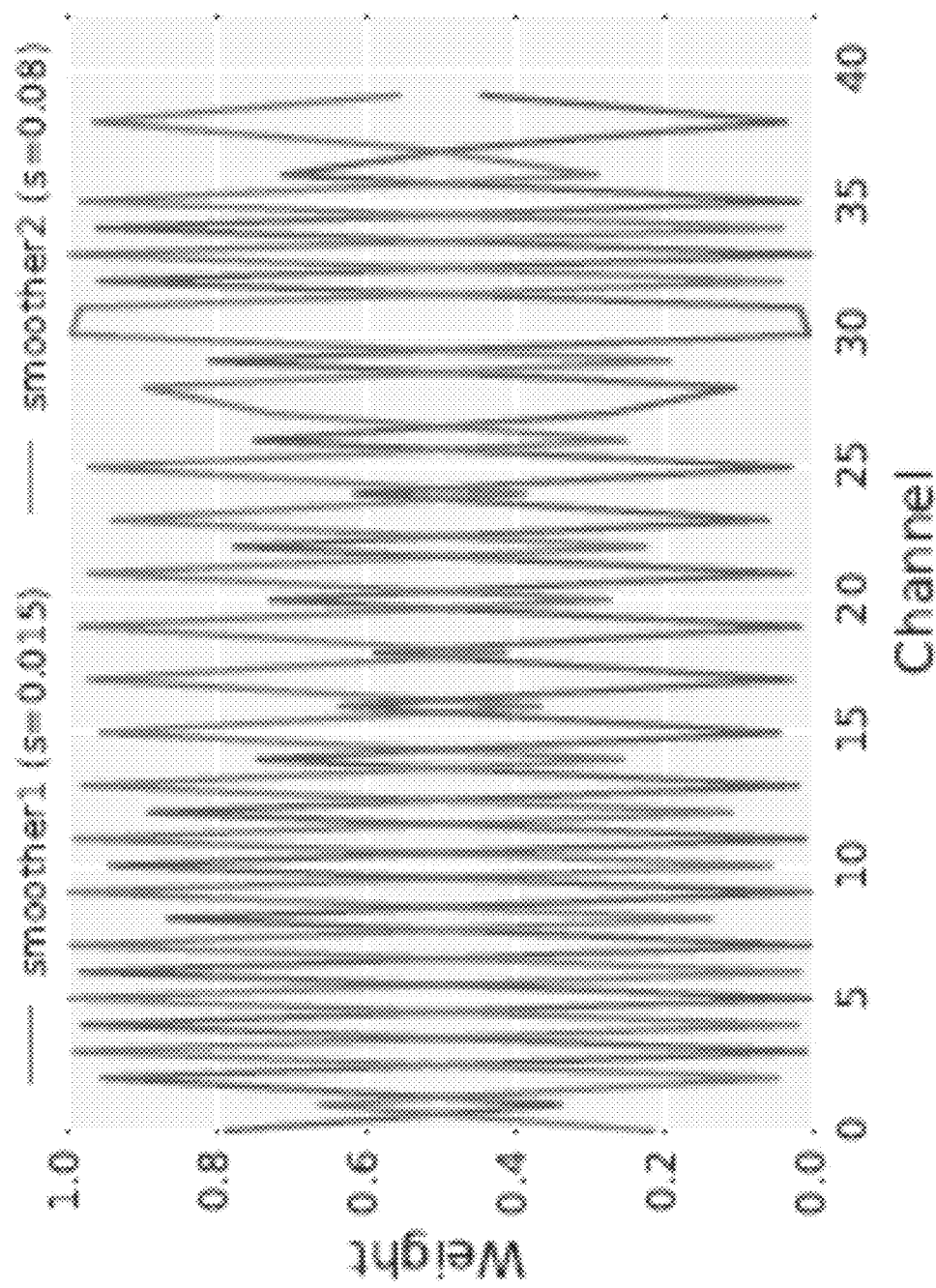
FIG. 6 shows a prophetic example of combination weights in a PCEN frontend, in accordance with some implementations.

FIG. 6 shows a prophetic example of combination weights in a PCEN frontend, in accordance with some implementations. In the example illustrated in FIG. 6 the smoother combination weights are learned by a joint model. In accordance with some implementations, the learned weights show an alternating pattern between frequency channels, where even numbered frequency channels prefer to use the slower smoother (s=0.015) while odd-numbered frequency channels prefer the faster smoother (s=0.08). In some instances, this pattern is caused by the redundancy in filterbank energy from neighboring channels. In accordance with some implementations, the network alternates between different features to obtain more discriminative information.

In accordance with some implementations, the system shown in FIG. 5 increases computational cost because it computes multiple smoothers first. In some implementations, the alternating pattern (e.g., illustrated in FIG. 6) is utilized to reduce that cost. In some implementations, a model is trained with a single smoother but computed using alternating smoothing coefficients (e.g., the other parameters are still learned as described before).

In various implementations, PCAN (Per Channel Amplitude Normalization) and/or PCEN (Per Channel Energy Normalization) are utilized for compressing features in a Hotword frontend.

In some implementations, a Hotword frontend computes features from input audio, which are passed as input to a neural network. In some implementations, the dynamic range of these features is compressed. In some implementations, the Hotword frontend analyzes kHz input audio (e.g., 8, 16, or 32) with integer samples (e.g., 8, 16, or 32) in millisecond long (e.g., 10, 25, or 50) chunks (also sometimes called frames) with a hop size of several milliseconds (e.g., 5, 10, or 15). In accordance with some implementations, for each frame of audio, the frontend computes a vector of features (e.g., 30, 40, or 50), corresponding to a number of frequency channels (e.g., 30, 40, or 50), each tuned to a different frequency band. In some implementations, the frontend obtains a spectrogram analysis of the sound by stacking successive frames of features horizontally. In some implementations, these features are input to a neural network.

In some implementations, the input frame of audio is multiplied with a millisecond Hamming window (e.g., 10, 25, or 50 milliseconds). In some implementations, a fast Fourier transform (FFT) (e.g., with a 16, 32, or 64 millisecond FFT length) is applied to the windowed audio. In some implementations, square magnitudes of FFT coefficients are accumulated to compute mel-scale energies. In some implementations, a squareroot is applied to the mel-scale energies to obtain amplitudes. In some implementations, in each frequency channel, a version of the amplitude is computed that is smoothed across frames. In some implementations, this smoothing is done with a single-pole lowpass filter with a millisecond time constant (e.g., 100, 250, or 500 milliseconds), computed recursively by:

$$\text{smoothed amplitude}_{n+1} = c \cdot \text{amplitude}_n + (1-c) \cdot \text{smoothed amplitude}_n$$

Equation 8—Recursive Amplitude Smoothing

In Equation 8, subscript denotes frame index. In some implementations, the coefficient c is calculated as:

$$c = 1 - \exp(-1/(\text{Frame Rate} \cdot \text{Hamming window}))$$

Equation 9—Smoothing Coefficient

In some implementations, spectral subtraction is performed by subtracting the smoothed amplitude from the current amplitude. In some implementations, the current amplitude is replaced with a small percentage of its value (e.g., 2, 5, or 10%) if the subtracted value would be less than that. In some implementations, the amplitudes are compressed with a logarithm. In some implementations, these log amplitudes are features for the neural network. In some implementations, PCAN normalization replaces the logarithm in the compression. In some implementations, PCAN utilizes a stiff feedforward automatic gain control. In some implementations, in each frequency channel, the features are computed by:

$$\text{feature} = \text{amplitude}/(\mu + \text{smoothed amplitude})^q$$

Equation 10—PCAN Feature Calculations

In some implementations, $\mu$ is a to prevent division by zero (e.g., $10^{-5}$, $10^{-6}$, or $10^{-7}$). In some implementations, q is a parameter between 0 and 1, where a larger q indicates stronger gain normalization. In accordance with some implementations, this normalization greatly compresses the dynamic range. For example, if the input audio is amplified by a factor of 1000, then the amplitude and smoothed amplitude are also a factor 1000 larger, but increase the features by only a factor of about $1000^{0.05} = 1.41$.

In some instances and implementations, energies (squared amplitudes) are processed instead of amplitudes. In some implementations, a PCEN frontend processes melscale energies. In some implementations, a smoothing filter is applied to energy, rather than the amplitudes. The features are computed by:

$$\text{feature} = (\text{energy}/(\gamma + \text{smoothed energy})^b + \varrho\,)^\beta - \varrho^\beta$$

Equation 11—PCEN Feature Calculations

Example values for these parameters in Equation 11 are b=0.98, $\beta$=0.5, $\gamma$=1 (or on the order of $10^{-9}$ times the maximum energy), and $\varrho$=2.

In some instances and implementations, it is more costly to compute the smoothed energy than the smoothed amplitude, since energy has a larger dynamic range. In some implementations, a PCEN-like PCAN frontend is utilized (e.g., as an intermediate between PCAN and PCEN). The features for the PCEN-like PCAN frontend are computed by:

$$\text{feature} = (\text{amplitude}/(\gamma + \text{smoothed amplitude})^b)^2 + \varrho\,)^\beta - \varrho^\beta$$

Equation 12—PCEN-Like PCAN Feature Calculations

Example values for these parameters in Equation 12 are $\alpha$=0.98, $\beta$=0.5, $\gamma$=1, and $\varrho$=2.

In accordance with some implementations, a PCEN-like PCAN frontend is modeled as a PCAN followed by the function:

$$s(x) = \sqrt{x^2 + 2} - \sqrt{2}$$

Equation 13—Smoothed Shrinkage Function

Application of Equation 13 has a denoising effect of modifying small values.

In some implementations, PCAN, PCEN, and/or PCEN-like PCAN frontends are implemented in floating point as a greco stream.

In some implementations, floating-point normalization frontend (e.g., PCAN, PCEN, or PCEN-like PCAN) is utilized in a portable platform. In some implementations, a fixedpoint normalization frontend is utilized.

In some implementations, audio data is received by a microphone (e.g., microphone 516, FIG. 2A). In some implementations, the audio data is transmitted from the microphone to a frontend, which applies a short-time Fourier transform (STFT) to the audio data to produce a plurality of frequency channels (e.g., mel channels). In some implementations, the frequency channels are transmitted to a normalization frontend (e.g., PCEN, PCAN, or PCEN-like PCAN). In some implementations, the normalization frontend (also sometimes called a normalization module) generates a plurality of features from the frequency channels. In some implementations, the features are transmitted to a neural network (e.g., for hotword detection).

In some implementations, the audio data comprises speech, such as conversational speech and/or hotwords.

Figure 7:
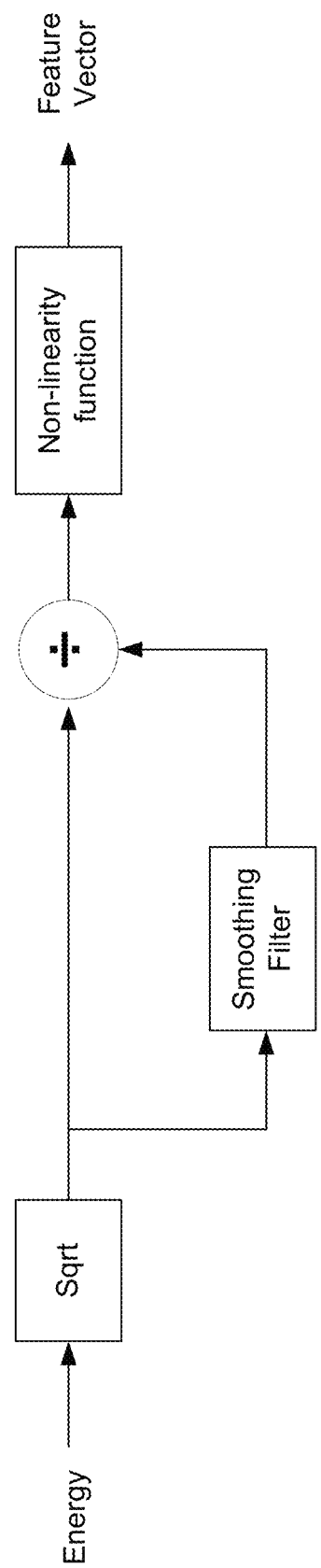
FIG. 7 is a block diagram illustrating a PCEN frontend, in accordance with some implementations.

FIG. 7 is a block diagram illustrating a PCEN frontend (e.g., normalization module 539), in accordance with some implementations. Energy is received by the PCEN (e.g., from an audio frontend via mel channels). A squareroot function is applied to the energy. The squarerooted energy is transmitted to a smoothing filter and then the squarerooted energy is divided by the smoothed energy. A non-linear function is applied to resulting normalized energy to produce the feature vector. In some implementations, the PCEN frontend is a component of a digital signal processing (DSP) module.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at an electronic device with one or more microphones, one or more processors, and memory storing one or more programs for execution by the one or more processors:
   receiving audio input data via the one or more microphones;

generating a plurality of energy channels for the audio input data;

generating a feature vector by performing per-channel normalization on each channel of the plurality of energy channels, including applying a smoothing filter to each of the channels, wherein coefficients of the smoothing filter are learned utilizing a neural network and the coefficients form an alternating pattern between adjacent channels of the plurality of energy channels; and obtaining recognized speech from the audio input utilizing the feature vector.

2. The method of claim 1, wherein obtaining the recognized speech includes:

transmitting the feature vector to a server system for speech recognition; and receiving recognized speech information from the server system.

3. The method of claim 1, wherein obtaining the recognized speech includes utilizing the feature vector as an input to the neural network.

4. The method of claim 1, wherein generating the plurality of energy channels comprises applying a short-time Fourier transform to the audio input data.

5. The method of claim 1, wherein performing per-channel normalization further comprises applying a non-linearity function to each of the channels.

6. The method of claim 1, wherein applying a smoothing filter to each of the channels comprises applying a first coefficient for a first energy channel and applying a second coefficient for a second energy channel, wherein the first coefficient is distinct from the second coefficient.

7. The method of claim 5, wherein the non-linearity function comprises a squareroot function.

8. The method of claim 1, wherein the per-channel normalization comprises one of a per-channel energy normalization or a per-channel amplitude normalization.

9. The method of claim 1, wherein the audio input comprises a user command; and the method further comprises:

recognizing the user command from the recognized speech; and generating a response to the user command.

10. An electronic device, comprising:

one or more microphones;

one or more processors; and memory storing one or more programs to be executed by the one or more processors, the one or more programs comprising instructions for:

receiving audio input data via the one or more microphones;

generating a plurality of energy channels for the audio input data;

generating a feature vector by performing per-channel normalization on each channel of the plurality of energy channels, including applying a smoothing filter on each of the channels, wherein coefficients of the smoothing filter are learned utilizing a neural network and the coefficients form an alternating pattern between adjacent channels of the plurality of energy channels; and obtaining recognized speech from the audio input utilizing the feature vector.

11. The electronic device of claim 10, wherein the instructions for obtaining the recognized speech includes instructions for:

transmitting the feature vector to a server system for speech recognition; and receiving recognized speech information from the server system.

12. The electronic device of claim 10, wherein the instructions for obtaining the recognized speech includes instructions for utilizing the feature vector as an input to the neural network.

13. The electronic device of claim 10, wherein the instructions for generating the plurality of energy channels comprises instructions for applying a short-time Fourier transform to the audio input data.

14. The electronic device of claim 10, wherein the instructions for performing per-channel normalization further comprises instructions for applying a non-linearity function to each energy channel.

15. The electronic device of claim 10, wherein the per-channel normalization comprises one of a per-channel energy normalization or a per-channel amplitude normalization.

16. A non-transitory computer-readable storage medium storing one or more programs, the one or more programs comprising instructions, which, when executed by an electronic device with one or more microphones, and one or more processors, cause the electronic device to:

receive audio input data via the one or more microphones;

generate a plurality of energy channels for the audio input data;

generate a feature vector by performing per-channel normalization on each channel of the plurality of energy channels, including applying a smoothing filter on each of the channels, wherein coefficients of the smoothing filter are learned utilizing a neural network and the coefficients form an alternating pattern between adjacent channels of the plurality of energy channels; and obtain recognized speech from the audio input utilizing the feature vector.

17. The non-transitory computer-readable storage medium of claim 16, wherein obtaining the recognized speech includes:

transmitting the feature vector to a server system for speech recognition; and receiving recognized speech information from the server system.

18. The non-transitory computer-readable storage medium of claim 16, wherein generating the plurality of energy channels comprises applying a short-time Fourier transform to the audio input data.

19. The non-transitory computer-readable storage medium of claim 16, wherein performing per-channel normalization further comprises applying a non-linearity function to each of the channels.

20. The non-transitory computer-readable storage medium of claim 16, wherein the per-channel normalization comprises one of a per-channel energy normalization or a per-channel amplitude normalization.

* * * * *